United States Patent Office 2,997,063
Patented Aug. 22, 1961

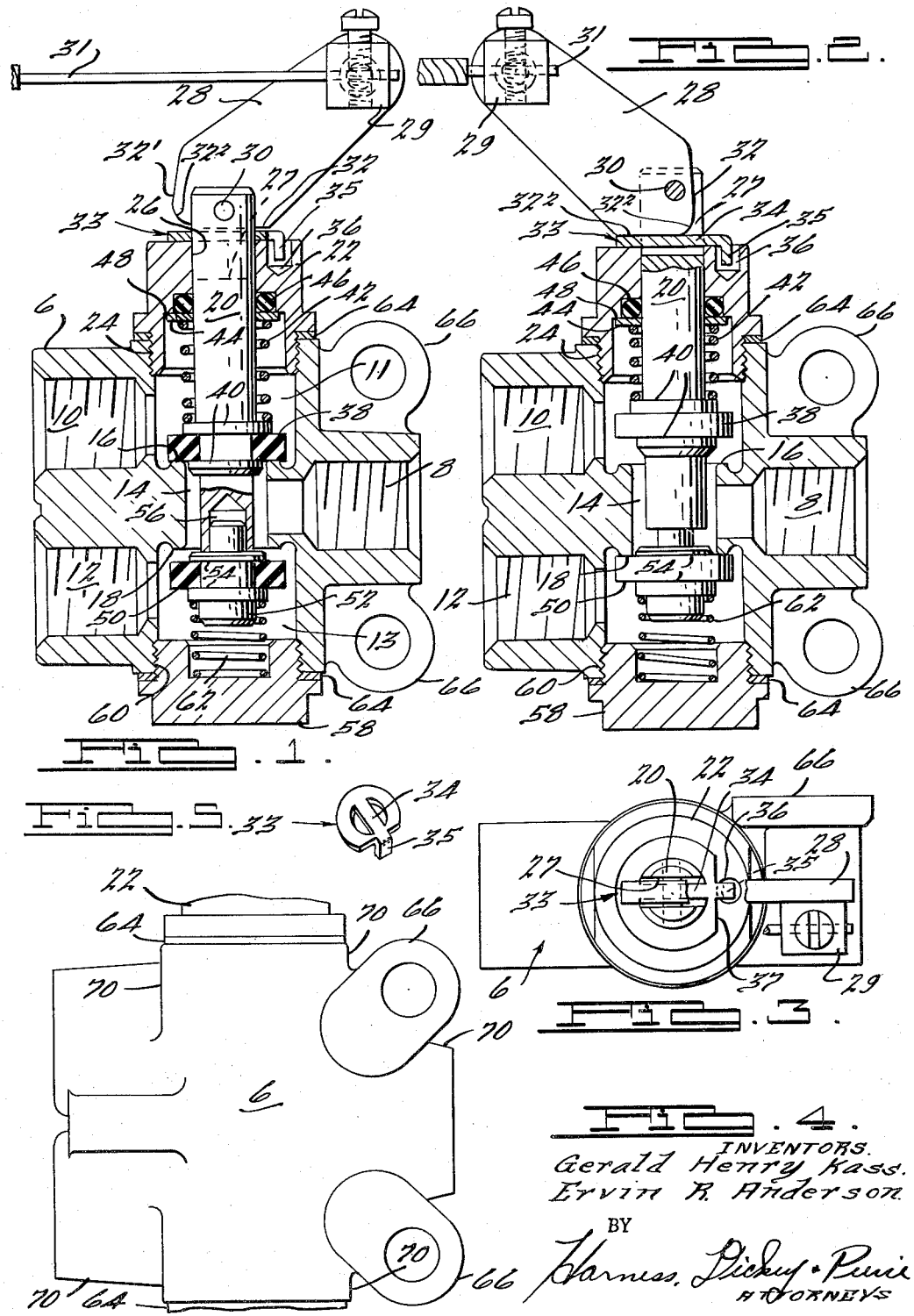

2,997,063
VALVE
Ervin R. Anderson, Lincoln Park, and Gerald Henry Kass, Garden City, Mich., assignors to Anderson Brass Company, Detroit, Mich., a corporation of Michigan
Filed May 6, 1957, Ser. No. 657,246
8 Claims. (Cl. 137—607)

The present invention relates to valves, and more particularly to three-way valves that are spring seated in both directions.

The preferred embodiment of the present invention is comprised of a valve body having a passageway therein with a first chamber communicating with the passageway intermediate the ends thereof and a pair of spaced-apart chambers communicating with opposite ends of the passageway. A valve stem is axially disposed within the passageway and has two valves mounted thereon that are adapted to seat against the opposite ends of the passageway with limited relative longitudinal movement permitted between the valves. A light-duty spring cooperates with one of the valves to urge it toward its seat and an opposing heavy-duty spring cooperates with the other valve to urge it toward its seat by overcoming the light-duty spring. Means are then provided for actuating the valve stem against the action of the heavy-duty spring to reverse the seating of the valves.

The present invention constitutes an improved combination wherein relative movement permitted between the valves reduces the accuracy required in the dimensioning and positioning of certain of the parts, including the locating of the valves and valve stem relative to each other and to the seats and other parts. Further, the actuating means need only move the valve stem in one direction since the heavy-duty spring will move the valve stem in the other direction. This construction readily lends itself to operation by Bowden wires, solenoids, and similar actuators which are adapted to exert a pulling force in one direction.

It is one object of the invention to provide an improved three-way valve that is seated in both directions by spring pressure.

It is another object of the invention to provide an improved three-way valve having two valve heads mounted on a common valve stem in a manner to permit limited relative movement therebetween.

It is a further object of the invention to provide an improved three-way valve having a fixed valve head and a slideably mounted valve head which cooperate to eliminate the need for accurately positioning the valves relative to their respective seats.

It is a still further object of the invention to provide an improved three-way valve which possesses a high degree of flexibility and adaptability not only with respect to the mode of actuation thereof but also by virtue of the fact that it can readily be mounted in different positions permitting "right hand" or "left hand" actuation, and is adapted to be "stacked" or grouped in alignment with a plurality of valves in a compact and convenient manner, as well as mounted in tandem with another valve to permit operation by a single Bowden wire.

Another object is to provide improved and simplified means for keying certain parts of the valve against undesired rotation, and for reducing wear.

It is a still further object of the invention to provide an improved three-way valve which is light in weight, inexpensive to manufacture and dependable in operation.

Other objects and features of novelty of the invention will become apparent when referring, for a better understanding of the invention, to the following description taken in conjunction with the accompanying drawing, wherein:

FIGURE 1 is a sectional view of a three-way valve embodying features of the present invention;

FIG. 2 is a sectional view of the three-way valve illustrated in FIG. 1 with the valve stem in its raised position;

FIG. 3 is an end view of the three-way valve illustrated in FIGS 1 and 2;

FIG 4 is a view of the underside of the three-way valve of FIGS 1 and 2; and

FIG. 5 is a perspective view of a detail.

Referring to the drawing, illustrating a preferred form of a three-way valve embodying the present invention, the valve body, generally designated 6, comprises a port 8 communicating with a central chamber or passage 14, and two ports 10 and 12 communicating, respectively, with chambers 11 and 13, the three chambers 11, 13 and 14 being coaxial. The ports 10 and 12 may be used as inlet ports, with port 8 defining the outlet or alternatively port 8 may be used as the inlet, ports 10 and 12 then serving as outlets to which the fluid may be selectively directed, as will be described in greater detail hereinafter. The chambers 11 and 13 are open at their opposite outer ends and provided with threads, as indicated at 24 and 60, respectively, to receive and hold correspondingly threaded end caps 22 and 58, respectively. The chamber 14 is of lesser diameter than either of the chambers 11 and 13, and by virtue of such difference in diameter a shoulder is formed at each end of the chamber 14. The outer opposite surfaces of such shoulders are finished to define valve seats designated 16 and 18 which, it will be appreciated, are accessible for finishing during the manufacture of the valve through the larger openings provided at the threaded open end portions 24 and 60.

A valve stem generally designated 20 is axially disposed within the chambered portion of the valve body, being slidably supported in an aperture 26 in the upper end cap 22. The upper end of the valve stem is provided with a diametric slot 27 extending downwardly a substantial distance from its upper end, an actuating arm being pivotally mounted in the slot 27 on a pin 30. The arm 28 is shown as actuatable by means of a Bowden wire 31 connected to the arm by means of a swivel connector 29. The lower end of the arm 28 is provided with angularly disposed flat portions 32, 32', which are located at different distances from the pin 30 and which are connected by a rounded cam portion $32^2$ which passes over center as the arm is swung to bring either of the flat portions into its operative position in which it extends perpendicularly with respect to the axis of the stem. It will be seen that when the arm 28 is in the right hand position as shown in FIG. 1 so that the flat portion 32 nearer to the pin 30 extends transversely, the stem 20 is in a lowered position, while when the arm is swung to the left, as shown in FIG. 2, the stem is raised.

A special keying and bearing washer 33 is fitted over the stem and lays flat against the top cap 22, the form of such washer being best shown in FIG. 5. The stem slides freely through the washer, which is provided with a diametric bar portion 34 which projects freely through the slot 27. As brought out in FIG. 2, the slot 27 is deep enough to provide clearance for the bar portion 34 in all positions of the stem. The washer is also provided with an integral down-turned lug portion 35 adapted to extend into a keying hole 36 in the cap. It will be observed that the lug portion 35 projects downwardly from approximately the midpoint of a flat portion 37 on the washer 33. This enables the keying hole 36 to be positioned closer to the center of the cap 22 than would be the case if the lug portion 35 projected from the circumference of the washer 33 for example, which in turn enables the diameter of the cap 22 to be reduced to provide a saving in material. With this construction, the lug 35 can also be formed from the material displaced during the formation of the flat 37 if desired. When the valve is assembled the cap is screwed down tightly and is thereby held against rotation, so that the washer, acting through the lug portion 35 and the bar portion 34, effectively keys the stem against rotation about its axis (such as might otherwise be caused, for example, by pushing on the Bowden wire 31 to move the arm from the FIG. 2 position to the FIG. 1 position). The hole 36 may be drilled in any desired angular position, or a plurality of such holes may be provided, so that the arm 28 can be so positioned as to move in any desired diametric plane rather than in a plane parallel to the ports 8, 10, 12, as shown. It will also be appreciated that the arm 28 and washer 33 may be formed of harder material than the cap, stem and body of the valve, which latter parts may be formed of die cast material, or of easily machinable material such as brass, while the arm and washer may be formed of steel. The design is such that the tendency to wear due to friction is largely confined to the cam surface $32^2$, center bar portion 34 of washer 33, and pin 30, all of which can be readily formed of steel to effectively resist the wearing effect of the engagement between such parts over a long useful life.

An upper valve 38 of synthetic rubber or the like is mounted on the stem 20 between flanges 40 and is adapted to be urged against the seat 16 by a heavy-duty spring 42 disposed between one of the shoulders 40 and a washer 44. An O ring 46 is disposed within an annular recess in the upper end cap 22 to provide a seal for the stem and is held in position by the washer 44 which also abuts against internal shoulder 48.

A lower valve 50 which may be the same as the upper valve 38 is mounted on a short supplemental or extension stem portion 52 between shoulders 54 and the upper end of the stem portion 52 is slidably disposed within a bore 56 in the lower end of, and coaxial with, the stem 20. A lower end cap 58 is mounted on the valve body by threads 60 and a light-duty spring 62 is disposed between the lower end cap 58 and one of the shoulders 54 to urge the lower valve 50 toward seat 18 and to prevent the upper end of the stem 52 from dropping out of the bore 56.

Suitable gaskets 64 are provided between the valve body 6 and each of the end caps 22 and 58, and a pair of mounting flanges 66 extend laterally from the valve body 6 for mounting purposes. It will be observed that the valve body 6 is symmetrical, and the upper and lower threaded cap-receiving portions 24, 60 are alike, so that the upper and lower end caps 22 and 58 can be reversed to permit the valves and valve stem to be inserted from the end shown at the bottom rather than the top. The body can then be inverted, to thereby, in effect, locate the mounting flanges on the opposite side.

In operation, a Bowden wire 31 may be attached to the upper end of the arm 28 to actuate the arm to either of the positions shown in FIGS. 1 and 2. When the arm 28 is pivoted to the position shown in FIG. 2, the stem 20 is cammed upwardly by the cam surface $32^2$ which compresses the heavy-duty spring 42 and permits the light-duty spring 62 to seat the valve 50. As shown in FIG. 2, the stem 20 has moved upwardly a distance slightly greater than necessary to seat the valve 50, and this is compensated for by the sliding relationship between the upper end of the stem 52 and the bore 56.

With the valve in the position shown in FIG. 2, the port 8 communicates with the port 10 through the communicating passageway 14 and chamber 11, and when the arm 28 is pivoted by the Bowden wire 31 to the position shown in FIG. 1, the heavy-duty spring 42 will overcome the light-duty spring 62 to seat the valve 38 and unseat the valve 50. This connects the port 12 to the port 8. Of course, it is apparent that since the heavy-duty spring 42 serves to actuate the stem 20 inwardly, the stem 20 can be outwardly actuated by other suitable means, such as a solenoid or other pulling force rather than the pivoting arm arrangement.

Referring to FIGS. 3 and 4, it will be seen that the outer faces of flanges 66 lie in a plane which clears the remainder of the valve body 6 for mounting purposes, and the flanges are so positioned as to permit two valves to be stacked together or mounted in tandem if desired.

As stated previously, the valve may be connected so that the ports 10 and 12 are inlets and the port 8 the outlet, or the connections reversed so the port 8 becomes the inlet and ports 10 and 12 become the outlets, although when the latter arrangement is employed, the valve generally cannot operate in as high a pressure system as with the former arrangement unless the ratings of springs 42 and 62 are increased.

The valve of the present invention particularly lends itself for use in conjunction with fuel line connections between a carburetor and twin gas tanks of an automotive vehicle. For example, one valve can be connected in the relatively high-pressure side where the fuel is pumped into the carburetor and a second valve can be connected in the low-pressure return line from the carburetor to the tanks (which return lines are commonly provided in order to prevent vapor locks). In the case of the first valve, one of the gas tanks is connected to the port 10 and the other to the port 12, with port 8 connected to the line leading to the carburetor. The second valve is connected in a similar manner in the return line system. With such an arrangement, it is desirable to mount the two valves for operation by a single control button, and this is easily accomplished by positioning them in tandem fashion so that arms 28 are aligned to permit a single Bowden wire to pass through the swivel connectors 29 of both valves to actuate the valves simultaneously. Consequently, both the feed line and return line connections to the carburetor can be switched from one gas tank to the other by a single actuation of the Bowden wire, and the Bowden wire readily lends itself to operation from the dashboard of the vehicle.

What is claimed is:

1. A three-way valve comprising a valve body having a passageway therein with spaced-apart chambers communicating with the ends of said passageway, and separate ports communicating with each of said chambers and with said passageway intermediate the ends thereof, a first end cap threadably mounted on said body for enclosing one of said chambers and having an aperture therein in axial alignment with said passageway, a second end cap threadably mounted on said body for enclosing the other of said chambers, a valve stem axially disposed within said passageway and having one end thereof extending through said aperture, a first valve mounted on said valve stem intermediate one end of said passageway and said first end cap, a second valve mounted on a short stem portion slidably interfitted with the lower end of said valve stem, a first spring means disposed between said first valve and said first end cap for urging said first valve into a seated position against said end of the passageway, a second spring means disposed between said second valve and said second end cap for urging said second valve into a seated position against the other end of said passageway, both of said spring means reacting against portions fixed to the body, said first spring means exerting a relatively greater force than said second spring means to normally bias said valve stem so that said first valve is seated against said one end of the passageway, and means for actuating said valve stem to overcome the biasing force of said first spring means to enable said second valve to seat against said other end of the passageway.

2. A valve comprising a valve body having a passageway therein with spaced-apart chambers communicating with the ends of said passageway, and separate ports communicating with each of said chambers and with said passageway intermediate the ends thereof, a valve stem extending through and movable longitudinally in said passageway, two valves mounted on said valve stem, at least one of said valves being loose with respect to the stem so as to permit relative longitudinal movement therebetween, stop means for limiting the movement of said valves in a direction toward each other, two opposed spring means, one acting between each of said valves and a surface portion fixed with respect to said body, said spring means urging said valves into seated position against the ends of said passageway, said opposed spring means normally biasing said stem in one direction so that one of said valves is normally seated on one end of said passageway, and means for actuating said stem to overcome the biasing force of one of said opposed spring means to enable the other of said valves to seat against the other end of said passageway, under the influence of the other of said spring means.

3. A valve comprising a valve body having a passageway therein with spaced-apart chambers communicating with the ends of said passageway, and separate ports communicating with each of said chambers and with said passageway intermediate the ends thereof, a valve stem extending through and movable longitudinally in said passageway with one end thereof extending outwardly of said valve body, two valves mounted on said valve stem, at least one of said valves being loose with respect to the stem, so as to permit relative longitudinal movement therebetween, stop means for limiting the movement of said valves in a direction toward each other, two opposed spring means, one acting between each of said valves and a surface portion fixed with respect to said body, said spring means urging said valves into seated position against the ends of the passageway, said opposed spring means normally biasing said stem in one direction so that one of said valves is normally seated on one end of said passageway, and means attached to said one end of said stem for exerting a pulling force for actuating the stem in one direction to overcome the biasing force of one of said opposed spring means to enable the other of said valves to seat against the other end of said passageway, said stem being actuated in the opposite direction by the biasing force of said opposed spring means when the pulling force is not applied to seat said one valve against said one end of the passageway.

4. A three-way valve comprising a valve body having a passageway therein with spaced-apart chambers communicating with the ends of said passageway, and separate ports communicating with each of said chambers and with said passageway intermediate the ends thereof, a valve stem extending through and movable longitudinally in said passageway, a first valve mounted on said valve stem and adapted to seat against one end of the passageway, a second valve slidably supported on said valve stem and adapted to seat against the other end of said passageway, means for limiting the longitudinal movement of said second valve relative to said valve stem, a first spring means reacting against a portion fixed to the body for urging said first valve into a seated position, a second spring means opposed to said first spring means acting between said second valve and a surface portion fixed with respect to said body for urging said second valve into a seated position, said first spring means exerting a relatively greater force than said second spring means to normally bias said valve stem so that said first valve is seated against said one end of the passageway, and means for actuating said valve stem to overcome the biasing force of said first spring means to enable said second spring means to seat said second valve against said other end of the passageway.

5. A three-way valve comprising a valve body having a passageway therein with spaced-apart chambers communicating with the ends of said passageway, and separate ports communicating with each of said chambers and with said passageway intermediate the ends thereof, a valve stem extending through said passageway, a first valve mounted on said valve stem and adapted to seat against one end of the passageway, a second valve mounted on a short stem portion slidably supported within a bore in the lower end of said valve stem, a first spring means reacting against a portion fixed to the body for urging said first valve into a seated position, a second spring means opposed to said first spring means acting between said second valve and a surface portion fixed to said body for urging said second valve into a seated position against the other end of said passageway, said first spring means exerting a relatively greater force than said second spring means to normally bias said valve stem so that said first valve is seated against said one end of the passageway, and means for actuating said valve stem to overcome the biasing force of said first spring means to enable said second spring means to seat said second valve against said other end of the passageway.

6. A three-way valve comprising a valve body having a passageway therein with spaced-apart chambers communicating with the ends of said passageway, and separate ports communicating with each of said chambers and with said passageway intermediate the ends thereof, an end cap removably mounted on said valve body for enclosing one of said chambers and having an aperture therein in axial alignment with said passageway, a valve stem axially disposed within said passageway having one end thereof extending through said aperture in said end cap, a first valve mounted on said valve stem intermediate said end cap and the one end of the passageway adjacent thereto, a second valve slidably mounted on the other end of said valve stem, means for limiting the longitudinal movement of said second valve relative to said valve stem in a direction toward said first valve, first spring means reacting against a portion fixed to the body for urging said first valve into a seated position against the end of the passageway adjacent thereto, a second spring means opposed to said first spring means acting between said second valve and a surface portion fixed with respect to said body for urging said second valve into a seated position against the other end of said passageway, said first spring means exerting a relatively greater force than said second spring means to normally bias said valve stem so that said first valve is seated against said one end of the passageway, and actuating means connected to said one end of the valve stem to overcome the biasing force of said first spring means to enable said second valve to seat against said other end of the passageway.

7. A three-way valve comprising a valve body having spaced-apart chambers therein with a communicating passageway therebetween and separate ports communicating with each of said chambers and said passageway intermediate the ends thereof, each of said chambers having internally threaded portions axially aligned with said passageway, a first end cap threaded in one of said threaded portions and having an aperture therein in axial alignment with said passageway, a valve stem axially disposed within and movable in said passageway and having one end thereof extending through said aperture, a first valve mounted on said valve stem intermediate said first end cap and the end of the passageway adjacent thereto, a second valve slidably mounted on the other end of said valve stem, means for limiting the longitudinal movement of said second valve relative to said first valve in a direction toward said first valve, a second end cap threaded into the other of said threaded portions, a first spring means for urging said first valve into a seated position against the end of the passageway adjacent thereto, second spring means for urging said second valve into a seated position against the other end of said passageway, both of said spring means reacting against portions fixed with respect to the body, said first spring means exerting a relatively greater force than said second spring means, to normally bias said valve stem so that said first valve is seated against said one end of the passageway, and actuating means connected to said one end of the valve stem to overcome the biasing force of said first spring means to enable said second valve to seat against said other end of the passageway.

8. The subject matter as claimed in claim 7 wherein said valve body is symmetrical with respect to a central plane perpendicular to the axis of said passageway, and has laterally extending mounting flanges for mounting purposes.

References Cited in the file of this patent

UNITED STATES PATENTS

| | | |
|---|---|---|
| 124,644 | Van Cleve | Mar. 12, 1872 |
| 480,667 | Miller | Aug. 9, 1892 |
| 509,602 | Miles et al. | Nov. 28, 1893 |
| 616,197 | Moller | Dec. 20, 1898 |
| 675,510 | Folsom | June 4, 1901 |
| 890,862 | Johnson | June 16, 1908 |
| 1,055,152 | Erickson | Mar. 4, 1913 |
| 1,284,063 | Davis | Nov. 5, 1918 |
| 1,426,731 | Harris | Aug. 22, 1922 |
| 1,550,812 | Jensen | Aug. 25, 1925 |
| 1,966,567 | Stoner | July 17, 1934 |
| 1,993,639 | Wiswell | Mar. 5, 1935 |
| 2,270,078 | Mueller | Jan. 13, 1942 |
| 2,324,690 | Gardiner et al. | July 20, 1943 |
| 2,741,843 | Sejman et al. | Apr. 17, 1956 |

FOREIGN PATENTS

| | | |
|---|---|---|
| 178,232 | Great Britain | Apr. 20, 1922 |